United States Patent [19]

Ryu et al.

[11] Patent Number: 5,548,751

[45] Date of Patent: Aug. 20, 1996

[54] DYNAMIC DATA STORAGE SYSTEM ALLOWING VARIABLE SIZE RECORDS AND FIELDS BY USING LINKED RECORD SEGMENTS

[75] Inventors: Tadamitsu Ryu, Yokohama; Yoshio Mogi, Tochigi; Masao Tomita, Omiya; Takanori Fukatsu, Kawasaki, all of Japan

[73] Assignee: Fujitsu Limited, Kawasaki, Japan

[21] Appl. No.: 198,396

[22] Filed: Feb. 14, 1994

Related U.S. Application Data

[63] Continuation of Ser. No. 665,586, Mar. 6, 1991, abandoned.

[30] Foreign Application Priority Data

Mar. 16, 1990 [JP] Japan ....................................... 2-66152

[51] Int. Cl.⁶ ..................................................... G06F 17/30
[52] U.S. Cl. ............... 395/600; 395/421.11; 395/497.02; 364/222.82; 364/245.1; 364/246.3; 364/251; 364/254.3; 364/254.6; 364/292.1; 364/242.2; 364/DIG. 1
[58] Field of Search ...................... 395/600, 425, 395/421.11, 497.02; 364/222.81, 222.82, 245.1, 236.3, 251, 251.7, 254, 254.3, 254.6, 282.1, 282.2

[56] References Cited

U.S. PATENT DOCUMENTS

| | | | |
|---|---|---|---|
| 3,596,257 | 7/1971 | Patel ................................... | 395/421.11 |
| 3,829,837 | 8/1974 | Farr, Jr. .............................. | 395/404 |
| 3,997,876 | 12/1976 | Frush ................................. | 369/47 |
| 4,536,837 | 8/1985 | Olson et al. ........................ | 395/600 |
| 4,580,211 | 4/1986 | Doki et al. ......................... | 395/497.02 |
| 4,603,380 | 7/1986 | Easton et al. ...................... | 395/440 |
| 4,685,057 | 8/1987 | Lemone et al. .................... | 395/421.11 |
| 4,758,944 | 7/1988 | Bartley et al. ..................... | 395/497.02 |
| 4,771,375 | 9/1988 | Begen et al. ....................... | 395/438 |
| 4,949,240 | 8/1990 | Iijima ................................. | 395/600 |
| 5,021,946 | 6/1991 | Korty ................................. | 395/600 |
| 5,089,952 | 2/1992 | Bozman .............................. | 395/726 |

FOREIGN PATENT DOCUMENTS

| | | |
|---|---|---|
| 0043391 | 1/1982 | European Pat. Off. . |
| 0116366 | 8/1984 | European Pat. Off. . |
| 0164578 | 12/1985 | European Pat. Off. . |
| 0446940 | 9/1991 | European Pat. Off. . |

OTHER PUBLICATIONS

Bec et al, *The Logical Design Of Operating Systems*, 1988; pp. 192–195, 210–215, and 273–283; Prentice Hall, New Jersey.

Dertel, *An Introduction To Operating Systems*, 1983, pp. 323–336 Addeson–Wesley, Massachusetts.

Martin, "*Computer Data–Base Organization*" 2nd Edition 1977, 1975 Prentice–Hall, Inc pp. 351–374.

Ogelvie, *Modula–2 Prooraming*, 1985, McGraw–Hill pp. 118–121 and 276–279.

(List continued on next page.)

*Primary Examiner*—Thomas G. Black
*Assistant Examiner*—Jack M. Choules
*Attorney, Agent, or Firm*—Staas & Halsey

[57] ABSTRACT

The system provides a data storage system program 18 between a user and a physical memory device 14 which stores file records 20. The data storage system 18 stores records as linked record segments 40/51 that can be randomly located within the memory storage device 14. The segments 40/51 are linked by a next segment address found in a next segment address field 50/56 of a record segment 40/51. When a record needs to be expanded and the current record segment 1000 is not large enough to accommodate the expansion, another record segment 1082 is allocated and used. If variable length record segments 40 are used, only a single record extension is required. However, if fixed length record segments 50 are used, the system allocates sufficient fixed length record segments to store the additional data. When records shrink in size or are deleted, the vacant space becomes available for reuse and the system attempts to remove the vacant space by combining record segments and storing a single segment in available vacant space.

2 Claims, 17 Drawing Sheets

OTHER PUBLICATIONS

Korth, *Database System Concepts,* 1986 McGraw–Hill pp. 235–245.

Melnitsky Review Of Deskeeper/Plus 3.0 in Product Comparison, "Digital Review", V6 N44 p. 63 Nov. 6, 1989.

Bic, L., et al., *The Logical Design of Operating Systems,* Prentice Hall, pp. 192–196, 210–216, 258–266, and 270–283 (2nd Ed. 1988).

Deitel, H. M. *An Introduction to Operating Systems,* Addison–Wesley Publishing Company, pp. 321–336 (1983).

Lorin, H., et al., *Operating Systems,* Addison–Wesley Publishing Company, pp. 285–291 (1981).

Jeffrey Ullman, "Principles of Database Systems", 1980, Pitman Publishing Ltd., London, GB, p. 54, line 16–p. 58, line 27.

IBM Technical Disclosure Bulletin, vol. 29, No. 10, Mar. 1987, New York, US, p. 4597, "Method for Updating Pointed Records".

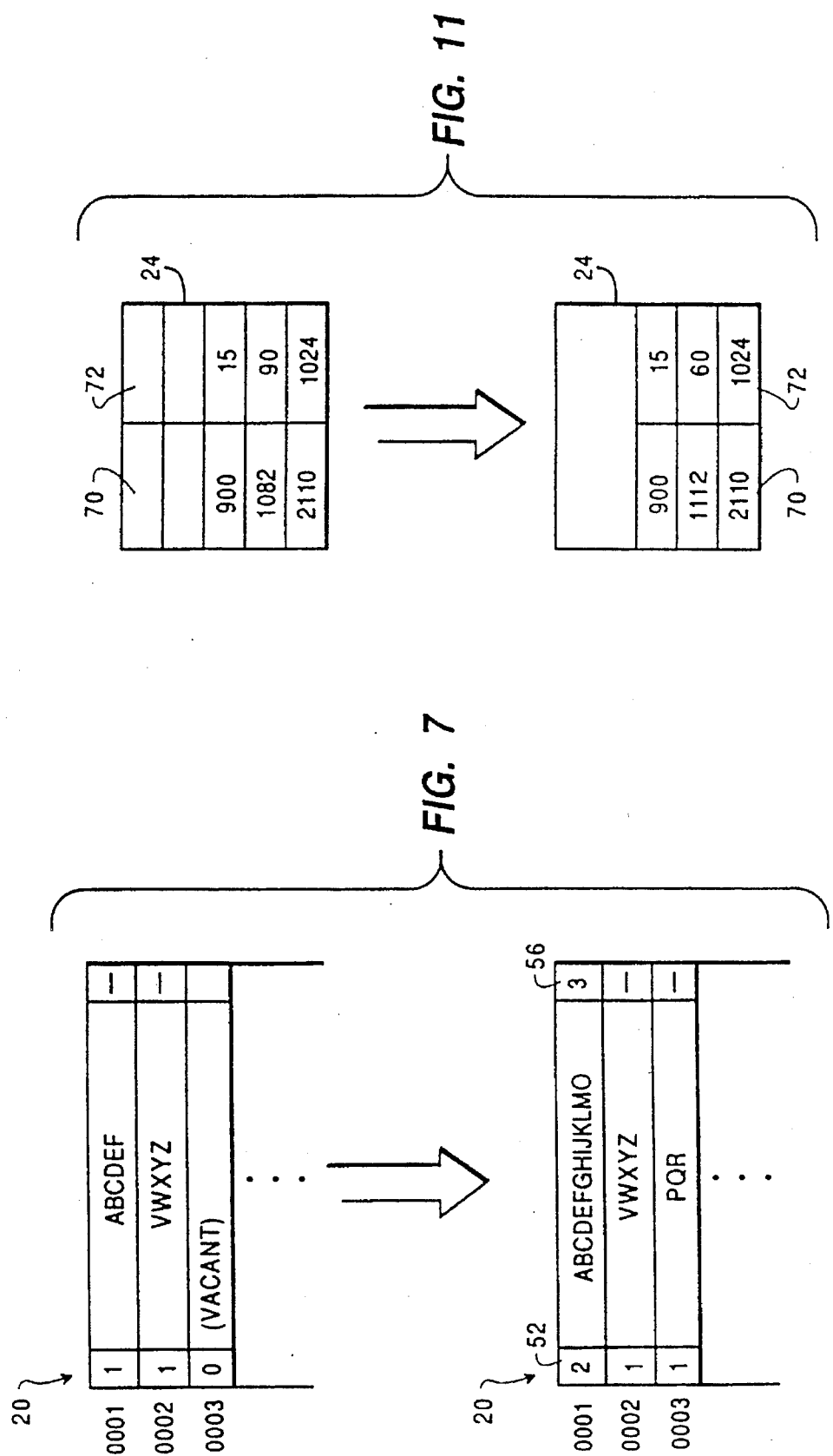

DYNAMIC DATA STORAGE SYSTEM ALLOWING VARIABLE SIZE RECORDS AND FIELDS BY USING LINKED RECORD SEGMENTS

This application is a continuation of application Ser. No. 07/665,586, filed Mar. 6, 1991, now abandoned.

BACKGROUND OF THE INVENTION

1. Field of the Invention

The present invention is directed to a data storage system designed to allow the size of records available for storing data to freely vary from record to record and over time and, more particularly, to a system that provides linked record segments where the segments can be added or subtracted to allow the record size to change, where the segments can be separately and randomly stored within data storage and where the system automatically consolidates the segments at a single location as space becomes available.

2. Description of the Related Art

The structure of conventional file systems is dictated by the application program designer when the application program is being designed. For example, during the design stage, the programmer prepares a data definition which defines the types and sizes of records in the file and defines the types and sizes of fields within each record. As the application program is created and debugged, the size, number and types of records, segments and fields can change. However, once the program is debugged, the sizes of the records, segments and fields within a record are fixed. If a user desires to change the size of a record, the application program must be redesigned and, unless the size definitions are changed, the user cannot enter data into a record or a field which is larger than the space originally defined for that record. Since it is common for a user to want to change the amount of data being stored in a record or a field during the life of a program, the cost and time required to change the data definitions for the program to customize the application program for the user can be large. This problem becomes much worse if the application program is part of a package distributed to many different users where the users want change the sizes of different records or fields. The maintenance problems associated with such changes also increase especially if a customized program is created and maintained for each user. This problem is becoming more serious because of the desire to allow the users' of software to freely change the sizes of data fields used for entering or outputting data on screen displays or terminals simply by entering more or less data for that record or field. The trend toward allowing customization of the terminal display by the user is thereby creating database maintenance problems. That is, the data definition redefinition problem is being further aggravated by the desire to increase the flexibility of the man machine interface.

One solution to this problem is to provide each record or field with a size that is sufficiently large so that any possible desired length of data can fit within the record or the field. This is done at the design stage in a discussion between the program designers. This is an impractical solution to the problem and is particularly inefficient in the utilization of the storage. Another solution is to maintain a master application program in such a way as to take into account each of the changes requested by all the users, so that the size of the records or fields grow until the worst case for each record is satisfied. This wastes memory space and requires that all users be provided with an updated program each time a change to the master program is made. This also requires that the users submit change requests to the program designer and therefore does not satisfy the flexibility need associated with the man machine interface. This solution is also an expensive solution.

What is needed is a system which will allow record or field size to change dynamically without requiring redefinition of the sizes of the records or fields and which allows the user to enter a desired amount of data no matter what is the record or field size.

SUMMARY OF THE INVENTION

It is an object of the present invention to provide a system which allows record or field size to change dynamically based on the size or the length of the data input by the user.

It is another object of the present invention to provide a system that is not seen or is transparent to the users.

It is also an object of the present invention to provide a system that efficiently utilizes available memory space.

It is a further object of the present invention to provide a system that reduces maintenance requirements for application programs.

The above objects can be attained by a data storage system located between the application program and the physical memory device. The data storage system stores records as linked record segments that can be randomly located within the memory storage device. If a record needs to be expanded and the current record or location is not large enough to accommodate the expansion, another record segment is allocated and stored in another location. If variable length record segments are used, only a single record extension is required. However, if fixed length record segments are used, the system allocates sufficient fixed length record segments to store the additional data. When records shrink in size, the vacant space becomes available for reuse. Periodically and when records are deleted, the system performs a process that combines or concatenates record segments and removes vacant space.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 illustrates a record cross reference table of the present invention;

FIG. 5 illustrates a vacant space table of the present invention;

FIG. 6 illustrates a operation of the present invention using variable length record segments;

FIG. 7 illustrates operation of the present invention using fixed length record segments;

FIGS. 9, 10, 11, 12, 13 and 14 illustrate operation of the process of FIGS. 8A–8E.

DESCRIPTION OF THE PREFERRED EMBODIMENTS

Figure 1:
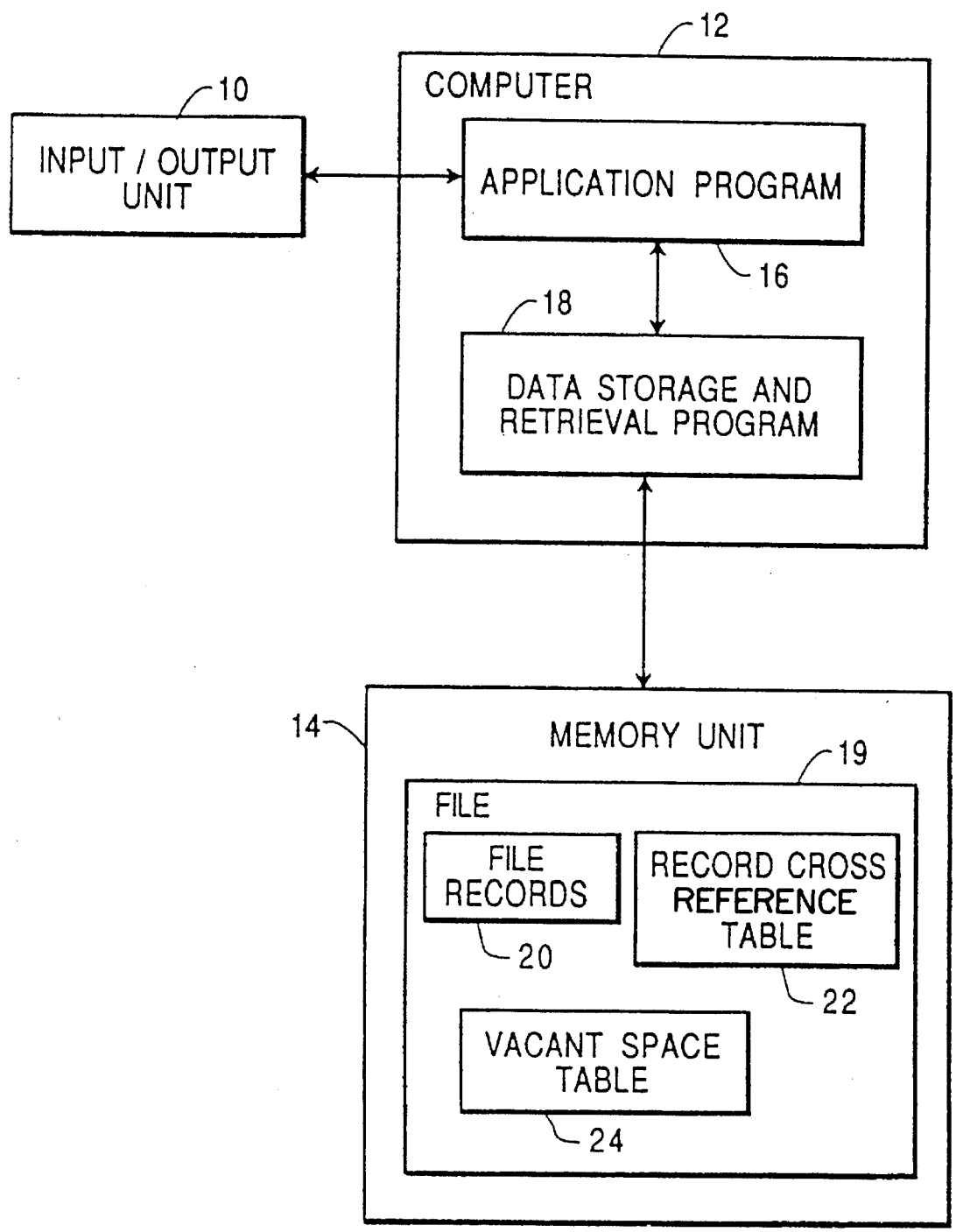
FIG. 1 illustrates components of the present invention.

The present invention, as illustrated in FIG. 1, includes an input/output unit 10 via which a user adds updates and deletes records. The input/output unit 10 is connected to a computer 12 which is also connected to a memory unit 14, such as a magnetic disk memory unit, and which is capable of randomly storing and retrieving data, typically alpha numeric data. Within the computer 12 an application program 16 exists which may for example create a display for the input/output unit 10 which, for example, allows a user to access and update records in a personnel system. That is, the application program 16 performs the operations associated with interfacing with the user. The application program 16 communicates with a data storage and retrieval program 18 which actually reads, updates and writes the records into the memory unit 14. The data storage and retrieval program 18 allows the user to access a file 19 and change the size of records 20 used by the application program 16 without regard to the original data definition of the application program 16. The data storage and retrieval program 18 is transparent to the user. The memory unit 14 for each file 19 accessed by the data storage and retrieval program 18 stores the file records 20, a record cross reference table 22 which is used to locate the records 20, and a vacant space table 24 which is used to determine vacant space within the file 19 that can be used for record storage. The record cross reference table 22 and vacant space table 24 are preferably stored in the header portion of the file 19. As discussed later it is possible to implement the system without the cross reference or vacant space tables.

During operation when a user requests that the contents of a record 20 or a field be obtained, the application program 16 preferably provides a record identifier (ID) to the data storage and retrieval program 18. This program 18 uses the cross reference table 22 to determine the physical location of the desired record 20, obtains the record 20 and provides the record 20 to the application program 16. This record 20 can be provided to the application program 16 by the invention in a number of different ways, however, it is preferred that the record 20 be provided to the application program 16 in two parts. The first part is a fixed size record header which includes the record ID, the size of the data field of the record and a pointer to a buffer which includes the data of the record and which data is the second part of the record. The application program 16 then provides the contents or data of the record 20 to the input/output unit 10. During a record update or record writing operation the application program 16 also preferably provides the record header which includes the record ID, the size of the data field of the record 20 and the pointer to the buffer that contains the data of the record 20 to the data storage and retrieval program 18. The data storage and retrieval program 18 then searches the cross reference table 22 to determine whether the record 20 exists and if not adds the record 20 as a new record 20 and if the record 20 does exist, updates the record 20. The operations of writing, reading and updating file records 20 in the memory unit 14 will be discussed in greater detail hereinafter.

Although the application program 16 is shown located within the same computer 12 as the data storage and retrieval program 18 and in direct association with the input/output unit 10 it is possible for the input/output unit 10 to be remotely located with respect to the application program 16, for example with the application program 16 communicating to the program 18 over a communication network, and for the application program 16 to be executed in a different computer than the computer 12 containing the data storage and retrieval program 18. It is also possible to have the memory unit 14 located remotely from the computer 12. It is preferred however that the input/output unit 10, computer 12 and memory unit 14 be locally located. A computer system such as a conventional personal computer or mini computer with a magnetic disk storage unit is preferred. It is also preferred that the data storage and retrieval program 18 be programmed in a language such as "C++" suitable for processing linked lists. The system illustrated in FIG. 1 and particularly the program 18 of course can interface directly with the user as an independent database utility maintenance program.

Figure 2:
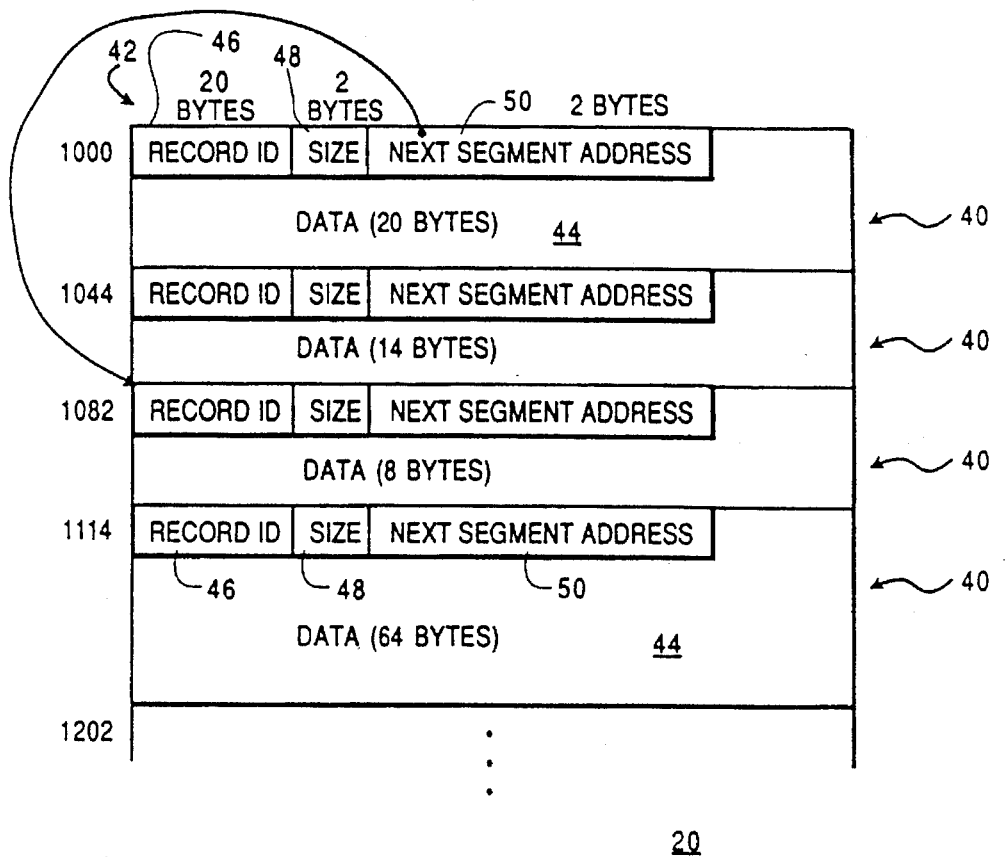
FIGS. 2 and 3 illustrate preferred data structures of the present invention.
Figure 3:
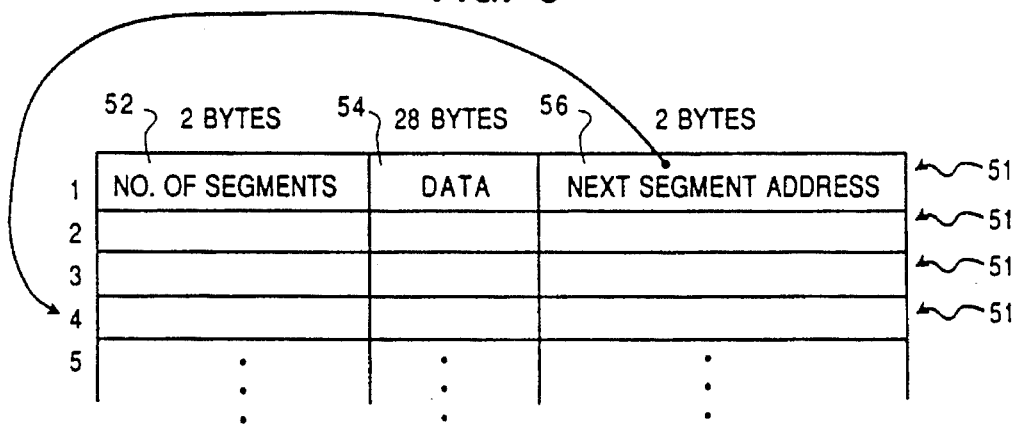

The present invention can use two different data structures for storing the segmented records which can both be used to accomplish the objects of the present invention, and which are illustrated in FIGS. 2 and 3. As illustrated in FIG. 2 each record segment 40 includes a record header 42 and a data field 44. The record header 42 includes a record ID field 46, a size field 48 and a next segment address field 50. The header 42 is of a fixed size and it is preferable that the record ID field 46 be 20 bytes long, the size field 48 be 2 bytes long and the next segment address field 50 be 2 bytes long. The data field 44 is variable in length with the size of the data field 44 being stored in the size field 48. The record ID field 46 can contain an alphanumeric record name which could correspond to the name of the field on the user's display or could be merely a record number. Each record 20 consists of one or more segments 40 with the segments being linked through the next segment address. As illustrated in FIG. 2, the record starting at location 1000 includes two segments, the first segment is a 20 byte segment which starts at the physical address 1000 and the second segment is an 8 byte segment which starts at physical address 1082. If a record 20 includes only a single segment 40, then the next segment address field 50 includes a null indicator which acts as an end of record 20 indicator or instead of a null indicator a special end of record code could be used. As can be seen from FIG. 2, the data fields are variable in length, for example, the data field 44 for the record segment 40 starting at address location 1000 is 20 bytes long while the record segment 40 starting at location 1114 is 64 bytes long.

The alternate data structure illustrated in FIG. 3 is a data structure which consists of fixed length record segments 51 where the fixed length is preferably 32 bytes. Each of the record segments 51 in the fixed length record data structure preferably includes a header field 52 the contents of which indicate the number of segments, including the current segment, remaining in the record. That is, if the record includes 5 segments, the first record segment, in the number of segments field 52, would include the number 5 and the second segment would include the number 4 and so on until the fifth record segment includes an end of record indicator which could be a special character such as a "*" or could be the segment count "1". It is also possible to put the segment count only in the first record segment and put a continuation code in the field 52 of all successive segments. The number of segments field 52 is preferably 2 bytes long. Adjacent the number of segments field is a data field of a fixed length, such as 28 bytes. Thus, in this embodiment of the data structure, the data in a record is divided into 28 byte segments and if the length of data is not evenly divisible by 28 bytes, then a portion of the data field 54 for the last segment will be empty. Adjacent the data field 54 is a next segment address field 56 or a link field which functions, in the same manner as the corresponding link field 50 shown in FIG. 2, to point to the physical address of the next segment 50 of the record 20 in the physical memory storage device, such as a magnetic disk. This field, when a next segment does not exist can contain a null indicator or a special end of record code.

The record data structures illustrated in FIGS. 2 and 3 have a preferred arrangement. It is possible, however, for a different arrangement of the fields to be used. For example, the next segment address field 56 could be adjacent to the number of segments field 52 in FIG. 3 and the size field 48 could be located subsequent to the address field 50 in FIG. 2. One advantage of the data structures of the present invention, in which the next segment pointers are part of the segment header is that a separate location table for secondary segments outside of the record itself is not necessary.

Figures 4, 5, 6:
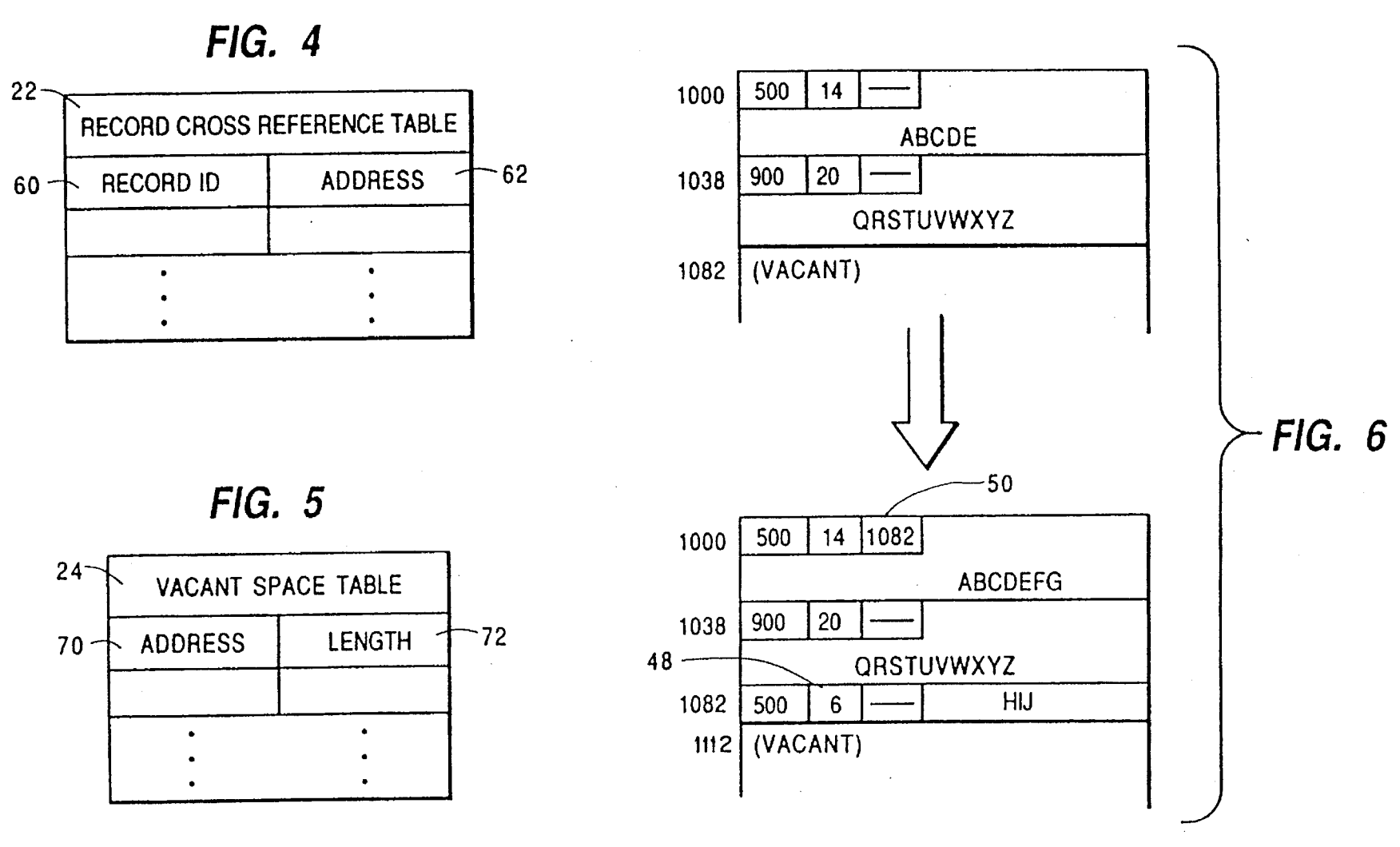

FIG. 4 illustrates the contents of a cross reference table 22. The cross reference table 22 includes a record ID field 60 which is examined by the process of the present invention to determine whether the record exists in the file 19 and if so, to obtain the address of that record from the address field 62. The address field 62 indicates the physical address of the first record segment 40 or 51 on the storage medium, such as the disk of the disk drive. This table 22 is not absolutely necessary but makes the program run faster even though additional memory space is used.

FIG. 5 illustrates the contents of a vacant space table 24. Each entry in this table 24 includes the address of the start of a vacant space in the file 19 and the length 72 of this vacant space. This table is also not absolutely necessary.

Prior to the first execution of the program 18, the application program 16 has been debugged and an appropriate data definition for the records has been used to originally allocate storage for the file 19. In this data definition the program designer has specified a size for the records 20 in the file 19, such as 224 bytes, and the file 19 has been created accordingly. Because of this invention, the designer need not be concerned with record size and the designer need not discuss record size with the other designers and can simply concentrate on generating the program. In other words, the file starts with record segments of an arbitrary size suitable for program testing as specified by the designer and the present invention adjusts record size to suit the particular user.

FIG. 6 illustrates the principle of operation of the present invention when variable length data fields 44 are provided as illustrated in FIG. 2 and FIG. 7 illustrates the principle of operation of the present invention when fixed length data fields and records are provided as illustrated in FIG. 3.

With respect to FIG. 6 assume that the original field or record on the user's display was originally designed during development to show seven alphanumeric characters of two bytes each. In this situation the record 20 with record ID 500 located at physical location 1000 would have seven alphanumeric character spaces available. Assume that the record includes the string "ABCDE" and four unused bytes, and that the user wishes to update the string to "ABCDEFGHIJ". In this situation the present invention would examine record 500 starting at location 1000, determine that the record 500 would only hold a portion of the updated string, would store that portion in the record segment, obtain the next available vacant space in the file 19 and use it to store the portion of the updated string which would not fit in the record segment at physical location 1000. The system would also add the address of the next segment of the record to the first segment address field 50 and enter the appropriate size in the size field 48 of the newly allocated segment which is in this situation located at physical location 1082. The size and location of the vacant space would also change.

For the fixed record length data structure, as illustrated in FIG. 7, we will assume that the user wishes to update the string "ABCDEF" to the string "ABCDEFGHIJKLM-NOPQR". In this situation, as in the variable length example previously discussed, the system will obtain the appropriate record segment using the cross reference table 22, determine that only a portion of the updated string will fit in the record segment, will update the data field 54 with the portion of the string which will fit therein, update the segment number field 52 to indicate that two record segments are involved and update the address field 56 to include the address of the next available record segment in the file 19 which can store the remaining portion of the string, in this situation record 0003. The number of segments field 52 of record 0003 is updated and a null indicator is entered in the next segment address field 56. The details of how the processes associated with FIGS. 6 and 7 perform these operations will be discussed in detail with respect to FIGS. 8A–BE and 15A–15D, respectively.

Figure 8A:
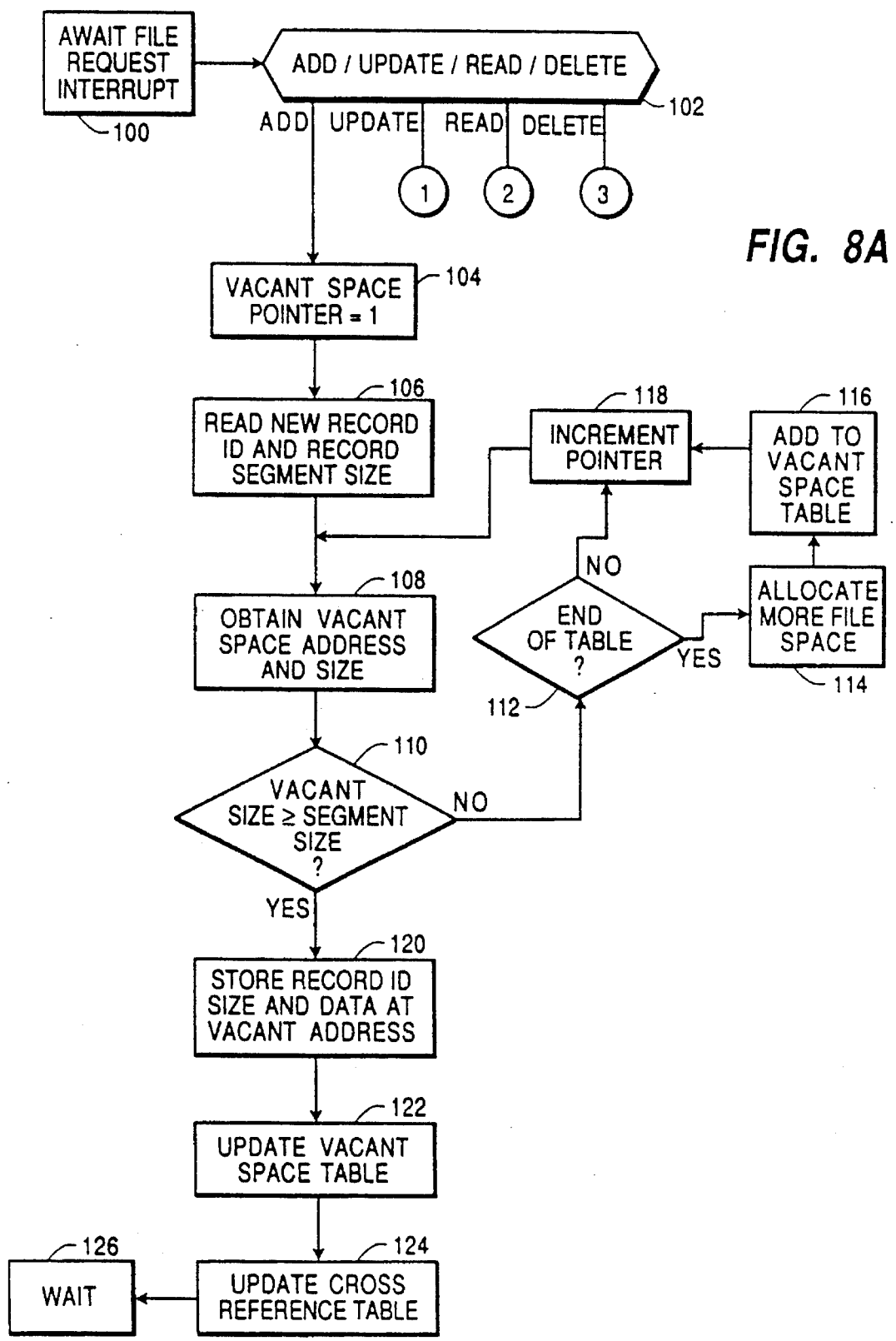
FIGS. 8A, 8B, 8C, 8D and 8E comprise a flowchart of the processes of thee present invention when variable length record.

The present invention as previously discussed with respect to FIG. 1, whenever the application program 16 produces a file request, preferably provides a record identifier, a size (number of bytes) of the record, if known, and a pointer to a buffer containing the data of the record if necessary and the buffer. The application program in this situation conventionally counts the bytes of data input and provides the size and the buffer. In addition, it is preferred that the application program 16 provide an operation indicator or command for the add, update, read and delete operations, however, the command is not absolutely necessary as discussed later herein but makes the invention operate faster. It is also preferred, as illustrated in FIG. 8A, that the present invention be interrupt driven and of course it is recognized as an alternative that the process 18 of the present invention can be called as a subroutine or subprocedure of the application program 16. FIG. 8A is a first of a series of flowcharts which illustrate the processes performed by the present invention when variable length record segments are used.

FIG. 8A illustrates not only a portion of the control process of the present invention which determines the type of file access request but also illustrates the portion of the process of the present invention which adds new records to the file. FIG. 8A will be discussed with respect to FIG. 9 which is an example of the record adding operation. Once a file request interrupt 100 or subroutine call has occurred, the process determines 102 from the command which of the operations is to be performed. When the new record addition operation is the file request command, a vacant space pointer is set 104 to the first entry in the table 24, which would be pointing at the entry with the physical address 846 illustrated in FIG. 9. Next the system reads 106 the record ID and size passed to the program 18 and for this example we will assume that the new record ID is 14 and the size is thirty bytes (six bytes of data and twenty-four bytes for the header). The system then reads 108 the entry in the vacant space table 24 and compares 110 the size from the vacant table size field 72, which is in this case three bytes, with the size of the record (which is thirty bytes). If the size of the vacant space is not sufficient to allow the new record to be inserted in the vacant space, which is the case for the vacant space at location 846, the system checks 112 to see if the end of the table 24 (and also the end of the file) has been reached.

If so the system calls a conventional utility which allocates 114 more file space and then updates 116 the vacant space table 24 accordingly. In the present situation the vacant size of three bytes is not sufficient for storing the record of length thirty bytes and the end of the table 24 has not yet been reached. In this situation the vacant space pointer is incremented 118 and the next entry in the table 24 is obtained.

Figure 9:
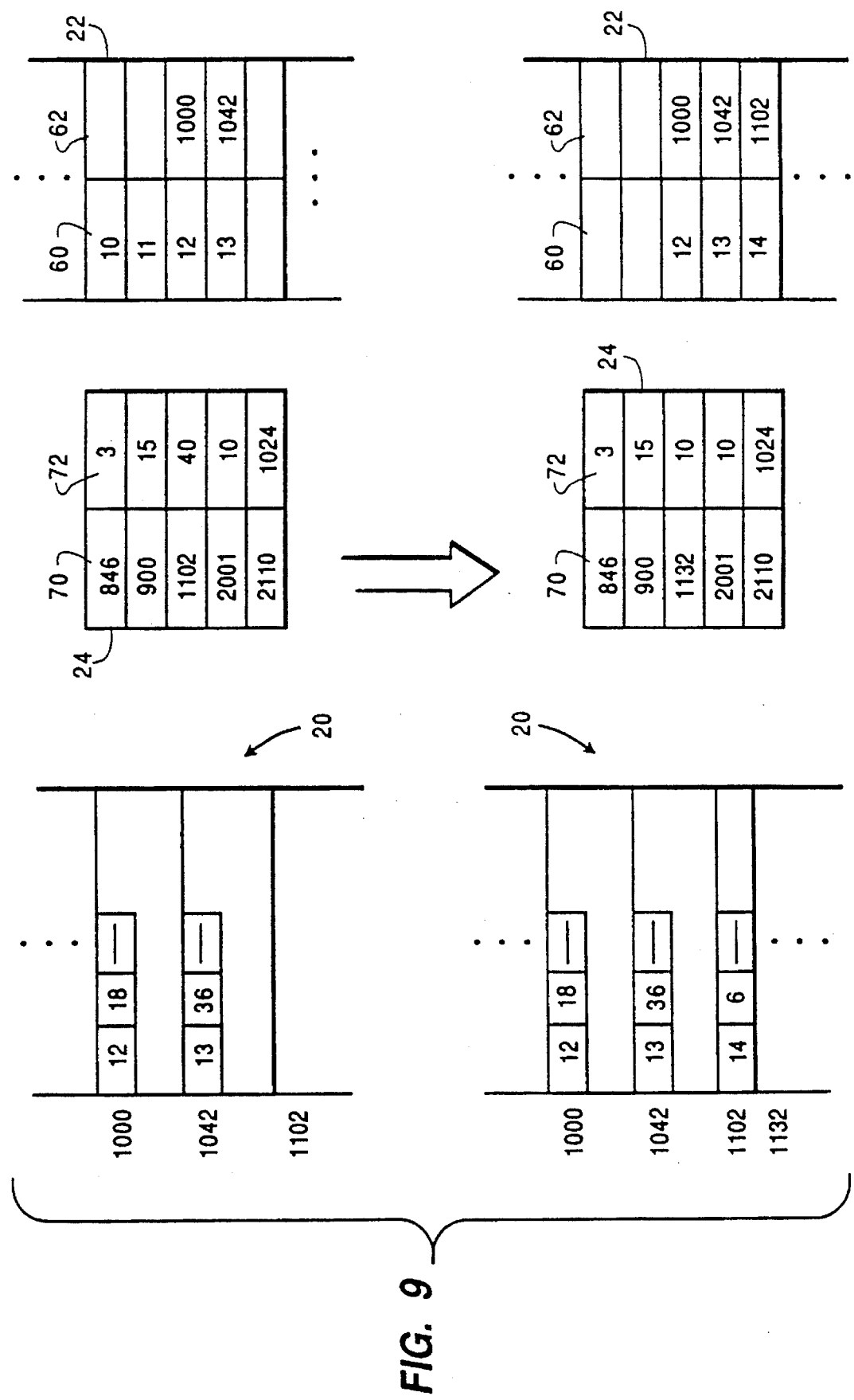

This cycle of searching the vacant space table 24 for a vacant space of suitable size continues until a space of sufficient size is encountered and in the example of FIG. 9 this will occur when the vacant space entry with the address of 1102 is encountered. Once a sufficiently large vacant space is encountered, even if it is obtained by expanding the size of the file 19, the system stores 120 the record ID, size and data at the vacant address as illustrated in the bottom half of FIG. 9 where a record with a data field of six bytes has been added at physical address 1102. Next the system updates 122 the vacant space table 24 to take into account the reduced size of the available vacant space, which in this situation results in a new vacant space address of 1132 and a vacant space size of 10 bytes. Next, the cross reference table 22 is updated 124 by adding the record ID for the record to the first available location in the table 22 along with the address of the new record, as illustrated by the entry in the table 22 in the lower half of FIG. 9 which has a record number identifier of 14 and an address of 1102. Once the table 22 is updated, the system returns 126 to the wait state or returns from the system call as is appropriate.

Figure 8B:
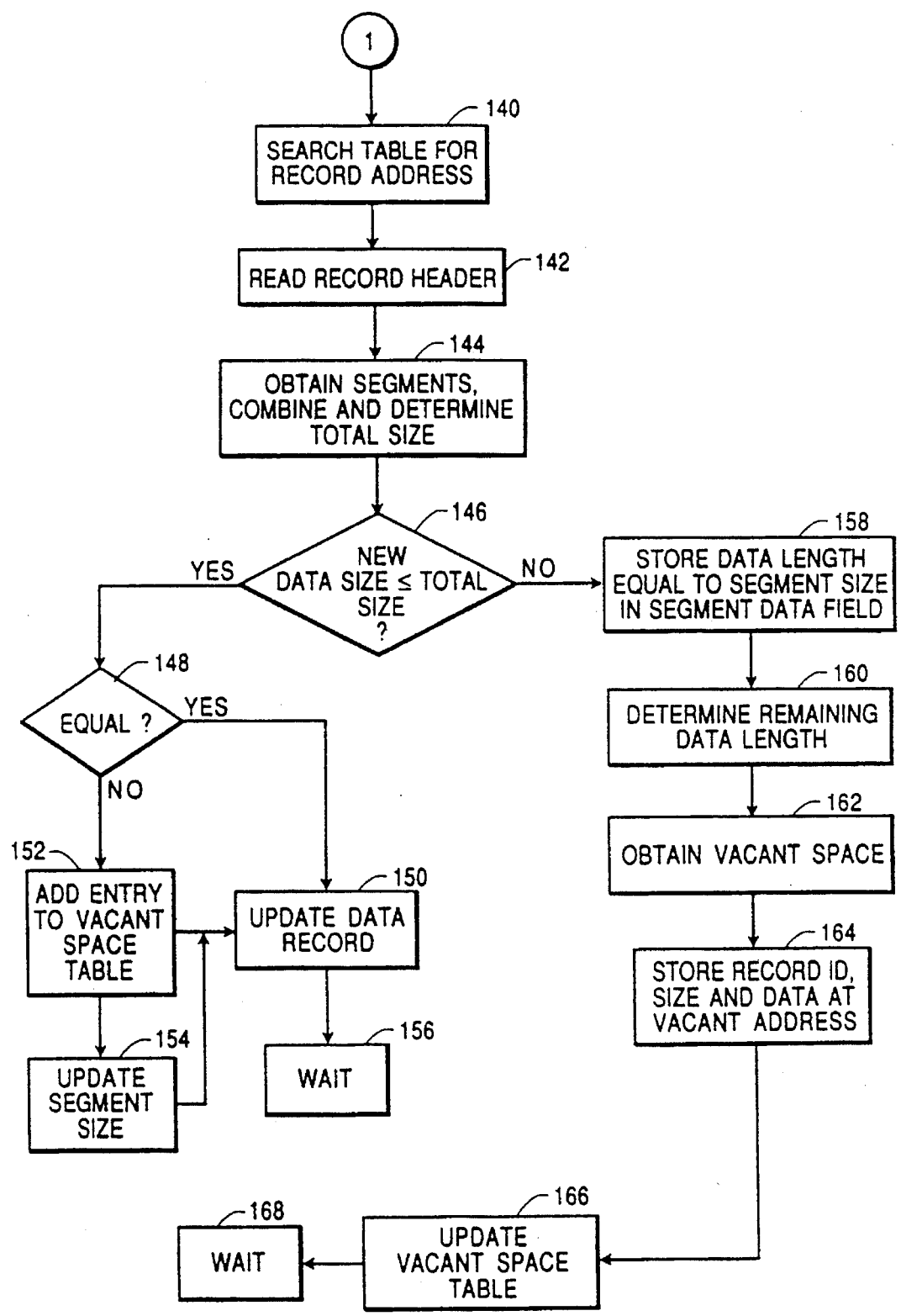

When the present invention is provided with an update or renewal file request, as illustrated in FIG. 8B, the cross reference table 22 is first searched 140 for the record ID of the desired record and the address of that record is obtained. The system then reads 142 the record header 42. If the record contains additional segments as indicated by a non-null next segment address field 50, the additional segments are obtained 144, combined and the total size of the record is determined. The steps of the block 144 will be discussed in more detail with respect to blocks 182–192 in FIG. 8C. Once the total size is determined it is compared 146 to the size of the record being updated. If the size of the record being updated is less than or equal to the total size, a determination 148 is made concerning whether the sizes are equal. If equal, the record segment or segments are updated 150 by dividing the data in the data buffer provided to program 18 into segments in accordance with the segment size found in the headers of each of the segments and the data is written into the appropriate record segments using the record segment addresses which are used to find the record segments during the segment combination operation.

Figure 10:
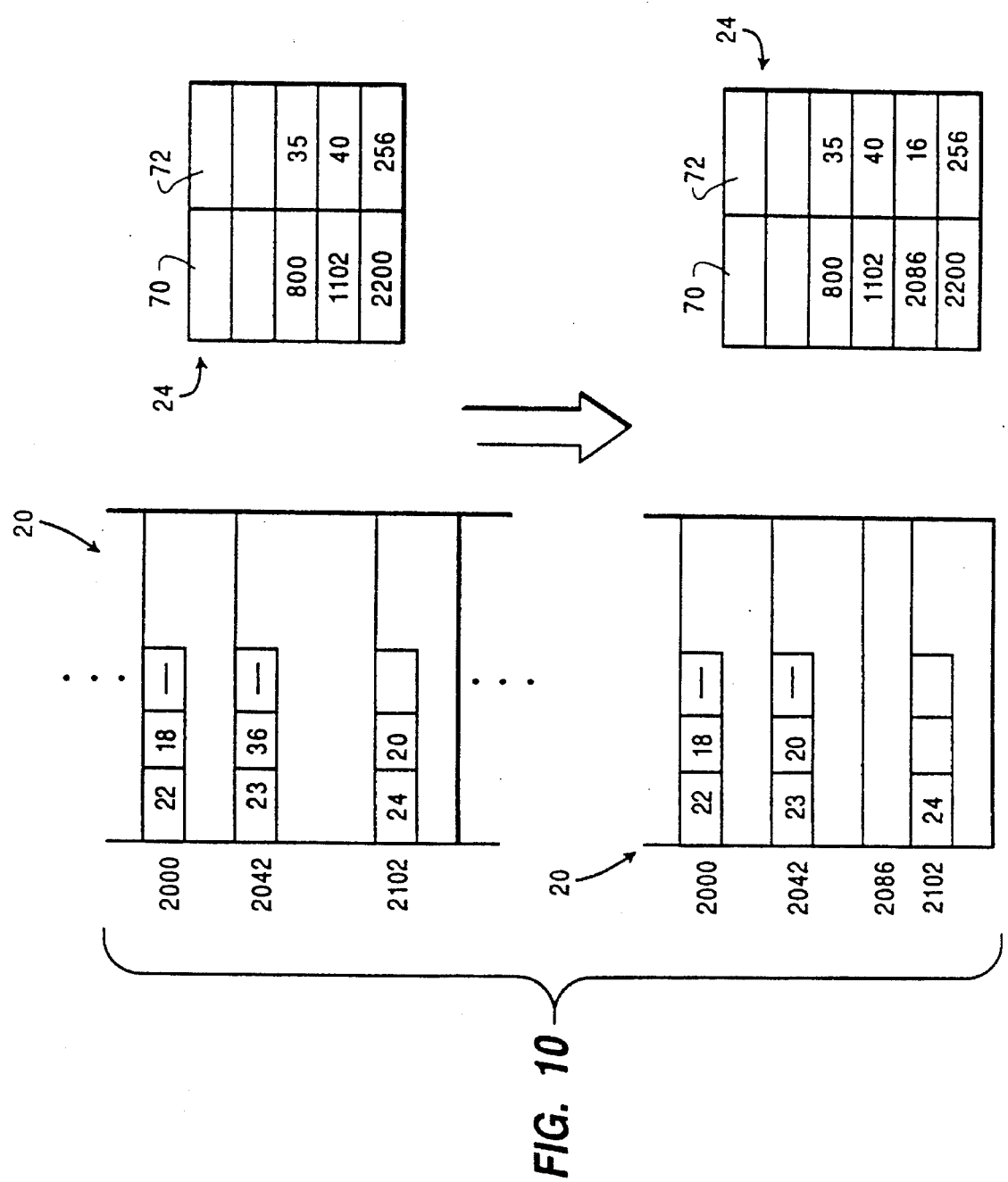

If the new data size is less than the total size of the originally stored record, and for the example in FIG. 10 we assume that the record has shrunk by sixteen bytes, the size of the vacant space which is created by the record size reduction is computed by subtracting the new data size from the total data size. The starting location of the vacant space is also determined and a new entry is added 152 to the vacant space table 24 as illustrated in the bottom half of FIG. 10 where a new entry for the physical address 2086 is found. Of course if the record size shrinks sufficiently to free up more than one segment, then several new entries to the vacant space table 24 are created. Once the vacant space table entries are created, the system updates 154 the segment size in the segments of the record to reflect the change in the total record size. Once the segment size in the appropriate segments is updated the data fields of the segments are updated which in this situation also involves clearing the new vacant space.

If the new data size is larger than the total size, and for this example we will assume that the record is increasing in size by six data bytes or a segment of thirty bytes, the system stores 158 the updated data in the segments of the record until the final data segment is encountered as indicated by a null next segment address field 50. The remaining data length is determined 160 and used to obtain 162 vacant space sufficient to store the remaining data plus a header as a new segment. The operation of obtaining the vacant space has been discussed with respect to steps 108–118 in FIG. 8A and need not be repeated here. Once an appropriate size vacant space is available, and in this example the vacant space is located at address 1082, the system stores 164 the record ID, the size equivalent to the remaining data length and the data starting at the vacant address and then updates 166 the vacant space table 24. The operation of segmenting the record and storing it in a vacant location has been illustrated in FIG. 6 and FIG. 11 illustrates how the contents of the vacant space table 24 would be changed for the example of FIG. 6 by the change of the entry having address 1082 to an address of 1112 with a size field 72 containing the value 60. Because the beginning of the record in this situation is located at the same position as prior to the update, the cross reference table 22 does not change.

Figure 8C:
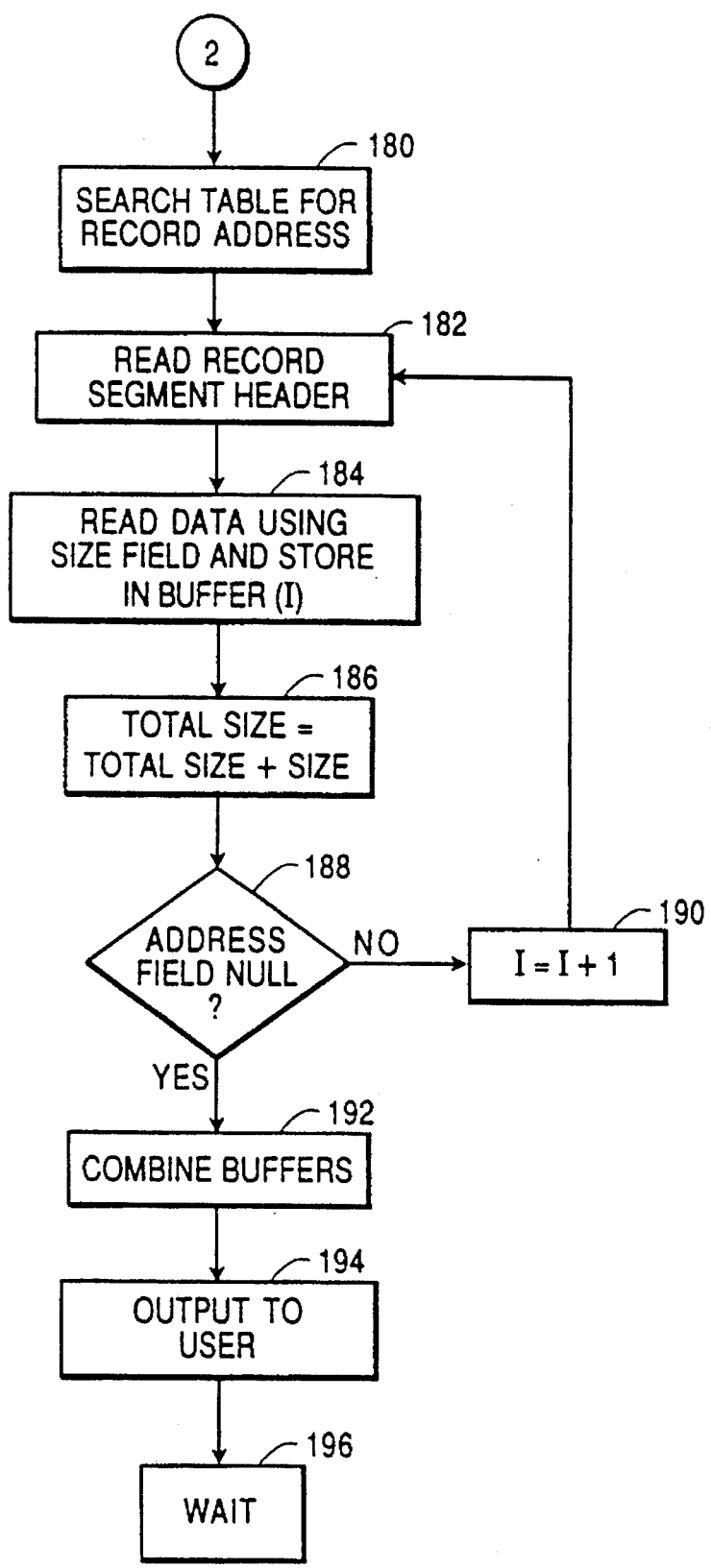

When the file request is a read or extraction request, as illustrated in FIG. 8C, the record ID in the request is used to search 180 the cross reference table 22 to find the address of the record. When the record address is found, the address is used to read 182 the size and the contents of the next segment address field 50 of the header 42, and the data in field 44 is stored 184 in a temporary buffer. Then the total size for the record is updated 186 by the size value found in the segment and a determination 188 is made concerning whether the address field 50 contains a null indicator indicating that this is the end of the record. If the address field 50 is not null this indicates that the record includes another segment. If the record includes another segment the buffer pointer is updated 190 and the next record segment header is read 182 using the address. When the last segment is found, the buffers are combined 192 and output to the user 194 by outputting the record ID, the size and a pointer to a buffer which contains the data of the record.

Figure 8D:
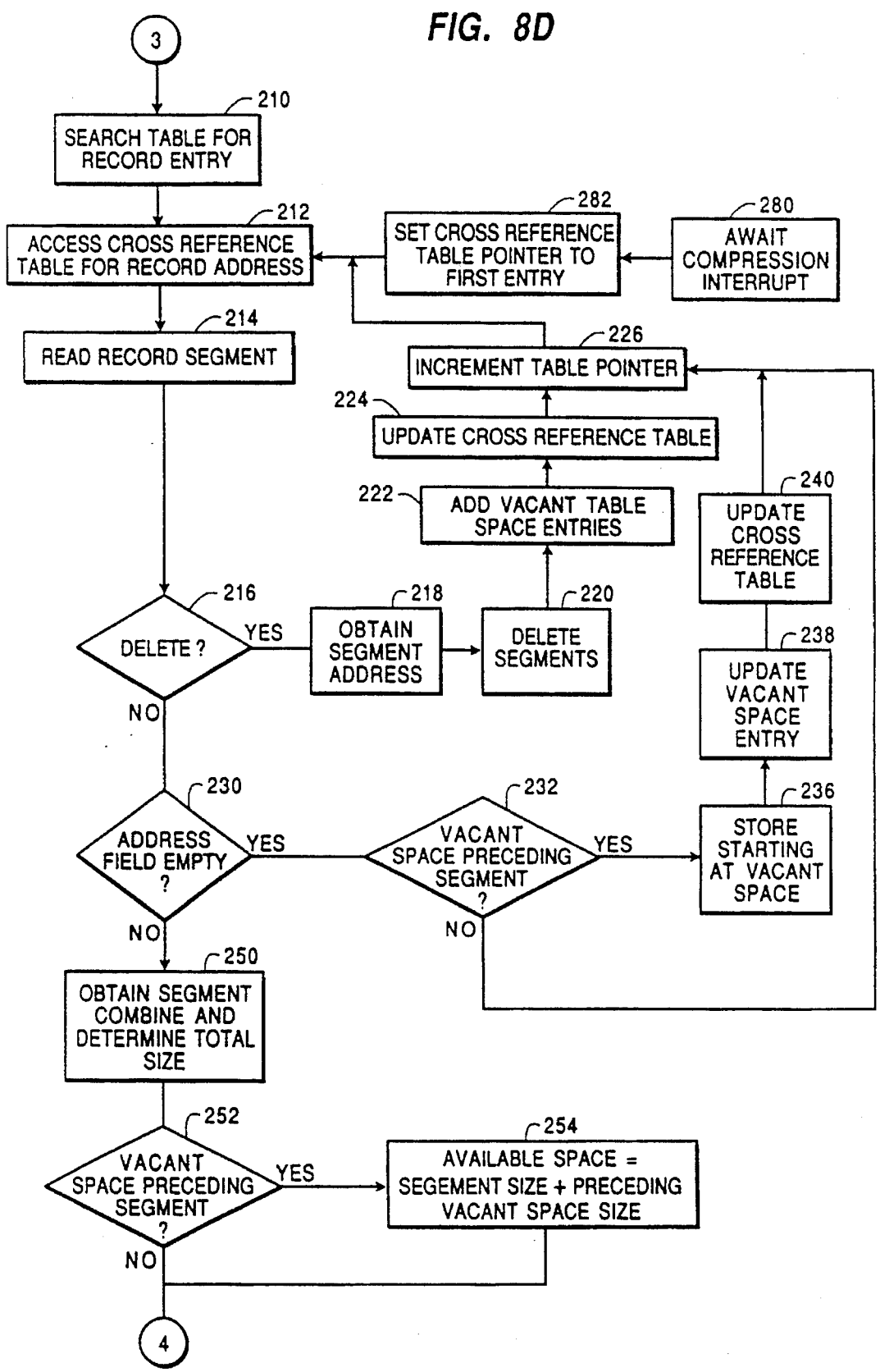
Figure 12:
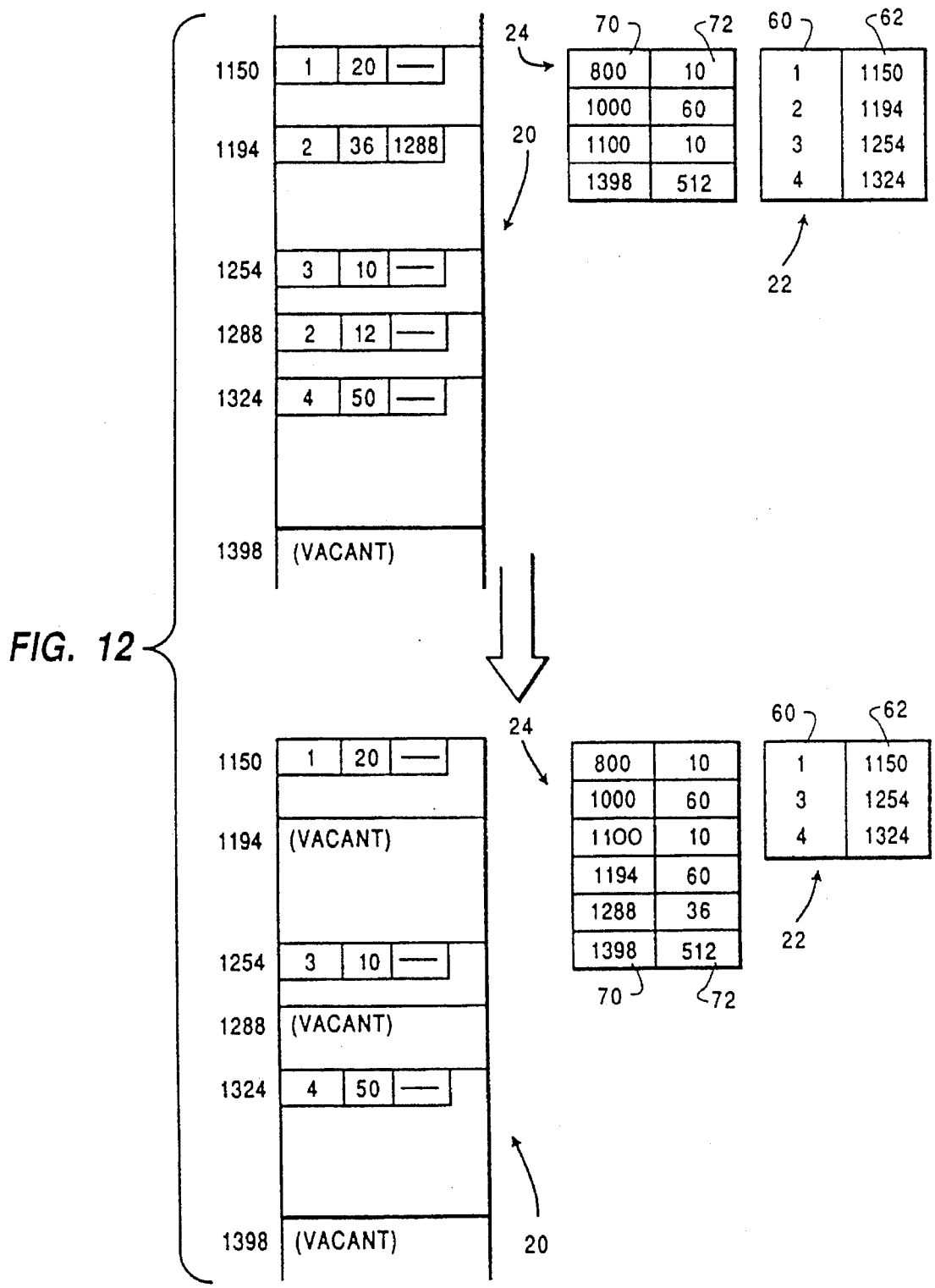

When the file request command indicates that a record should be deleted, as illustrated in FIG. 8D, the process searches 210 the cross reference table 22 for the record. In this situation using FIG. 12 as an example in which record number 2 will be deleted, the system accesses 212 the cross reference table 22 looking for record 2 and finds the address 1194. The system then reads 214 the record segment header 42 and the data 44 thereby obtaining the size and the contents of the next address field 50. A determination is then made 216 as to whether this record should be deleted. If so the chain of segment addresses in the next segment address field 50 is followed to obtain 218 all of the segments and the segment addresses and sizes are temporarily saved. The segments are then deleted 220 by clearing the space in the storage medium using the temporarily saved segment addresses and size indicators. The system then adds 222 vacant space entries to the vacant space table 24, as illustrated in the bottom half of FIG. 12, and then updates 224 the cross reference table to remove this record ID from the cross reference table 22, as also illustrated in the bottom half of FIG. 12. Next, the system increments 226 the table pointer to point to the next record in the cross reference table 22, which in this situation will be record number 3.

Figure 13:
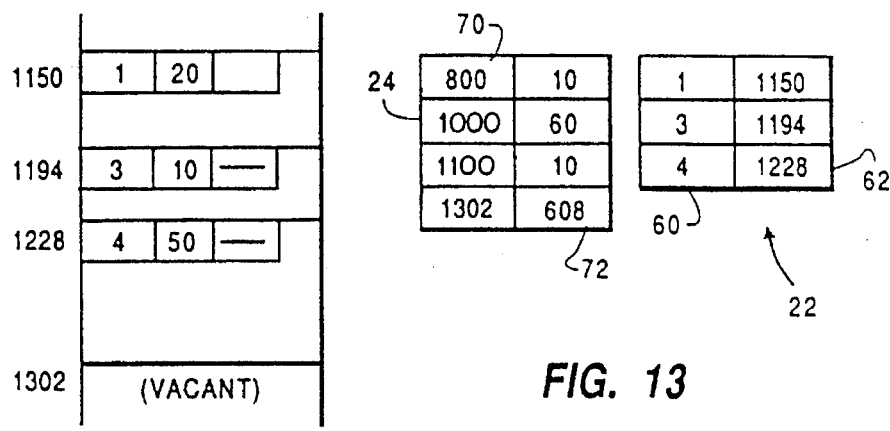

Once again the record segment is read and since this is not a record that needs to be deleted, the system proceeds to determine 230 whether the address field is empty. In this case, the field is empty and a determination is made 232 as to whether the segment has an immediately preceding vacant space. This is determined by searching the vacant space table 24 for the vacant space with the next lowest address, in this situation address 1194. Then length of the vacant space is added to the address resulting in an address of 1254 which is compared to the record address. If the addresses match an immediately preceding vacant space exists. If the segment does not have an immediately preceding vacant space, the table pointer is incremented 226 leaving the segment in its original location. However, in this situation as illustrated in the bottom half of FIG. 12 record 3 includes an immediately preceding vacant space and the record segment for record 3 is stored 236 starting at physical address 1194. Next the vacant space table 24 is updated 238 by changing the entry and the cross reference table 22 is updated 240 with the new address of the start of record 3. The table increment pointer is then incremented 226 to point at record number 4 and same process is performed again. The result is the compression of the records to remove vacant space after a record is deleted as is shown in FIG. 13.

Figure 14:
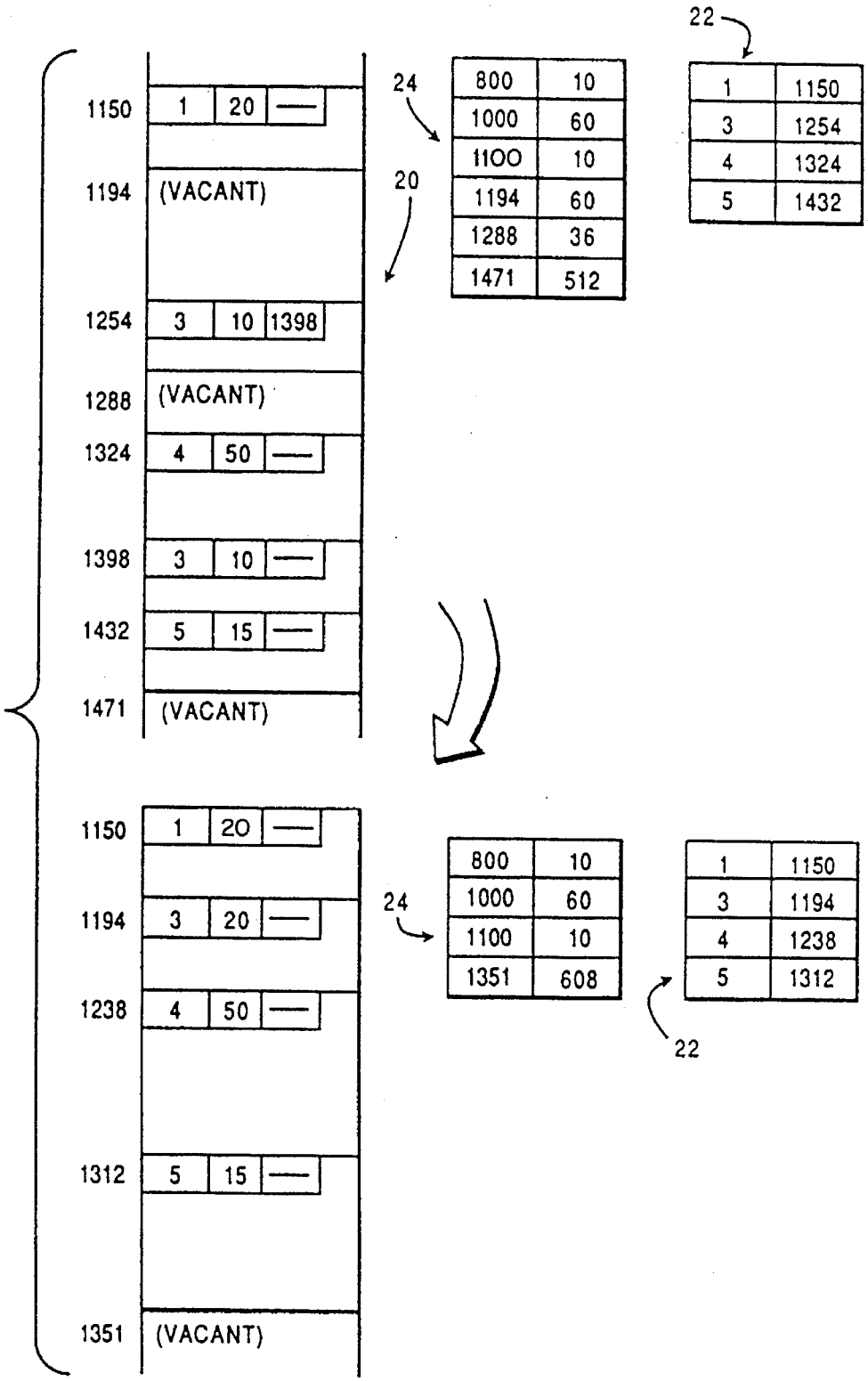

If the record number 3 when encountered at step 230 in FIG. 8D does not include a null address field, such as is illustrated in the top half of FIG. 14, the system follows the segment addresses and obtains the segments, combines the segments and determines the total size as discussed in more detail with respect to steps 182–192 in FIG. 8C. If the first segment in the record includes vacant space 252 preceding the segment, then an available space variable is computed 254 as the sum of the segment size and the preceding vacant space size. Next, the system determines 256 whether the segment has vacant space immediately after the segment. This is determined by adding the data size and header size of the record, record 3, to the address and comparing for a match in the vacant space table 24, which in this situation occurs for the table 24 entry with an address of 1288. In the example of FIG. 14 this is the case since vacant space exists at address 1194 and address 1288 both preceding and subsequent to the record segment at address 1254. If such subsequent vacant space exists, then the available space is increased 258 by the amount of the vacant space. Next, the available space is compared 260 to the total size obtained in step 250. If the available space is greater than or equal to the total size indicating that the entire record will fit within the preceding and subsequent vacant spaces and the segment being examined, then all of the segments of the record are deleted 262 by clearing the memory locations. Next the combined record is saved 264 at the start of the available space, in this situation at address 1194, and the cross reference and vacant space tables are then updated 266. This results in the file contents as illustrated in the bottom half of FIG. 14. If the available space is less than the total size the system searches 270 the vacant space table 24 for sufficient space as illustrated in FIG. 8A by steps 108–118. The segment is then stored 272 in the vacant space and the record segments for the record are deleted 274, followed by update 276 of the cross reference and vacant space tables. In other words, the record segments are consolidated and stored at a new location making the storage space previously occupied by the record segments vacant space.

Figure 8E:
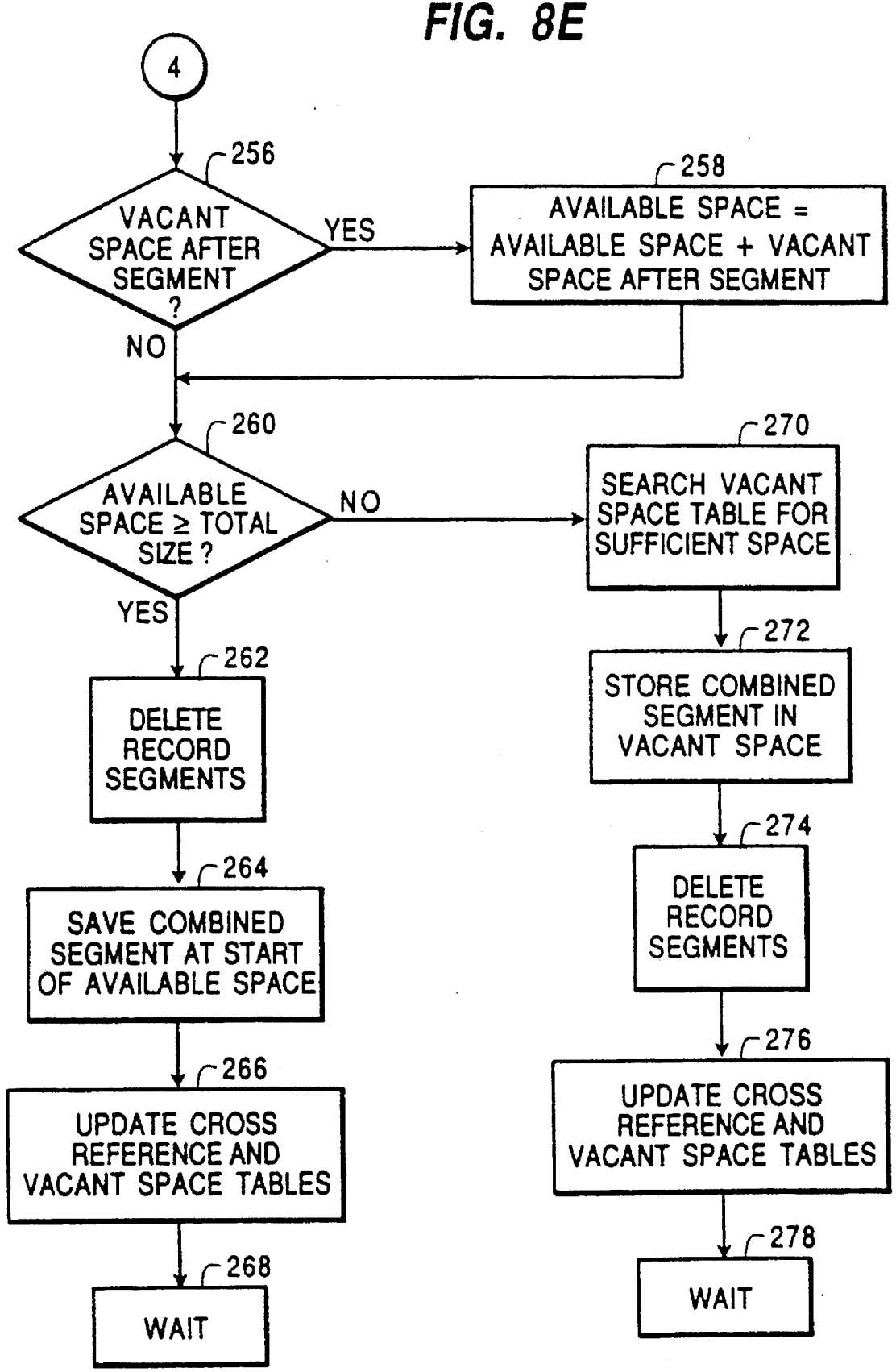

The steps 270–276 in FIG. 8E, can result in the creation of additional vacant spaces that are not removed as the system continues examining the records in the cross reference table 22. In addition, because the update operation of FIG. 8B can result in records being reduced in size additional vacant space can be created which is not removed by steps 210–276. This problem can be solved by performing the process of FIGS. 8D and 8E starting with the first record in the cross reference table 22 and sequentially proceeding through all the records in the file 19. As a result this process includes starting from a compression interrupt 280 and setting 282 the cross reference table pointer to the first entry in the table 22. In this way, all of the vacant space within the file is consolidated and all of the records which are divided into multiple segments are consolidated into a single record segment. Of course it is possible for this compression routine to be executed when the end of file is reached as detected in step 112 of FIG. 8A or when processing speed becomes slow as detected by the operating system.

The steps of FIGS. 8D and 8E result in an orderly layout of the records 20 of the file 19 which is constantly maintained by the periodic combination of record segments and the removal of vacant space in the file. This results in efficient use of the memory storage and the high speed location of a complete record in which access time is reduced. Of course, if desired, the records could be sorted into some order which will further reduce access time. The combining of record segments also reduces space requirements because multiple headers are not required since all headers of secondary segments are eliminated.

FIGS. 15A–15D illustrate the operation of the present invention when fixed length record segments are provided as illustrated in FIG. 7. The vacant space table 24 and cross reference table 22 of the prior embodiment are also used in this embodiment. In addition, the FIGS. 9–14 which illustrate the operation of the previously discussed embodiment are also applicable with respect to this embodiment except that the records rather than being variable in length are fixed length.

Figure 15D:
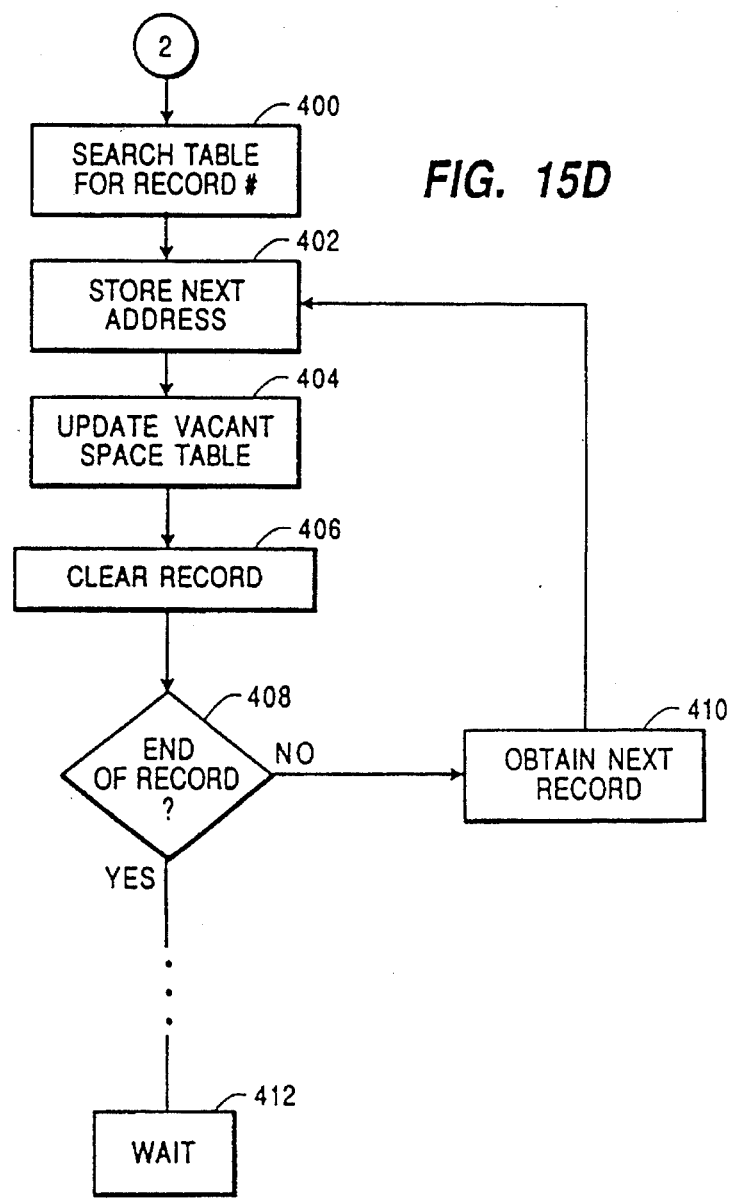
FIGS. 15A, 15B, 15C and 15D illustrate operation of the present invention when fixed length record segments are used.
Figure 15A:
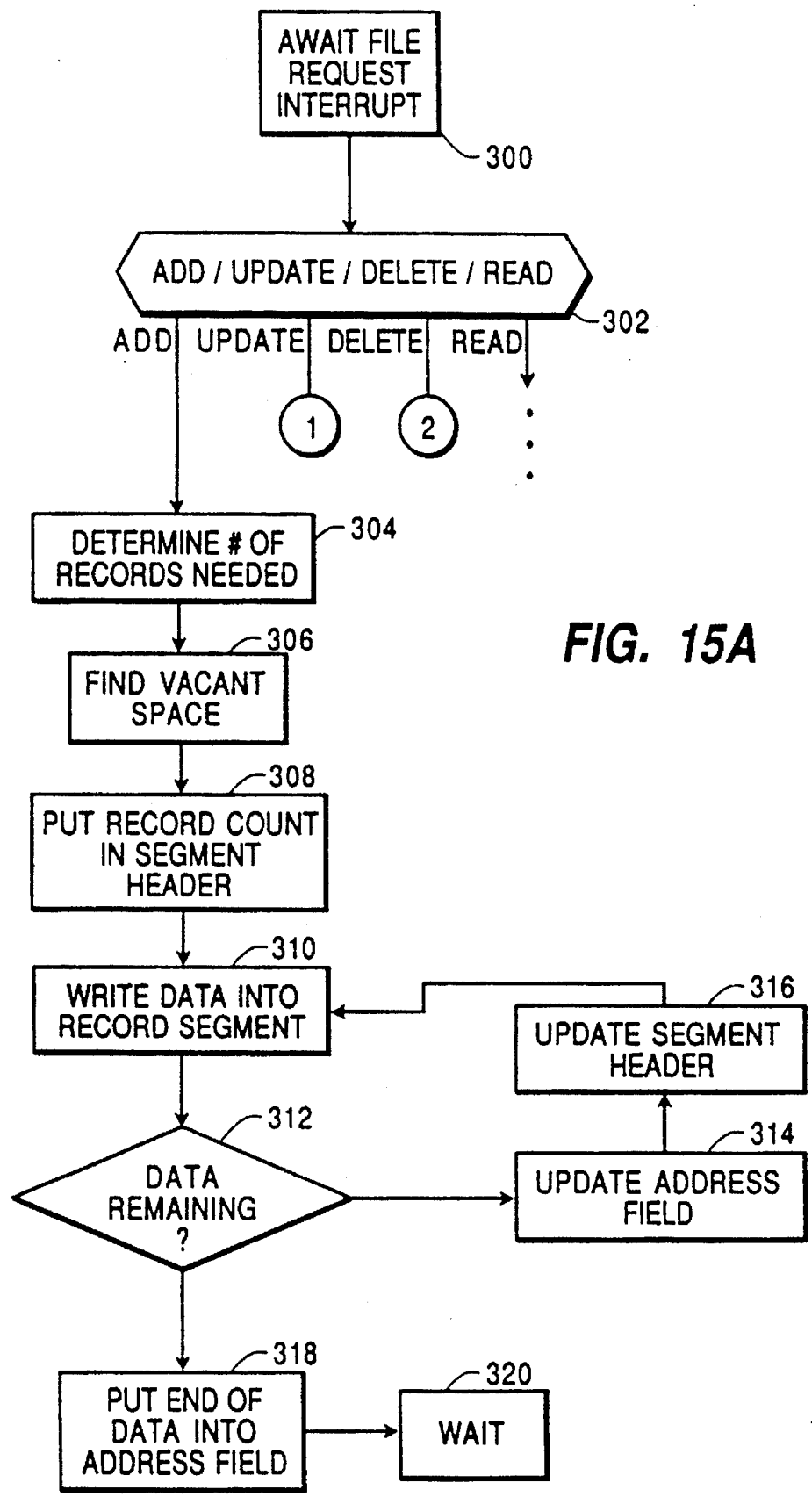

As illustrated in FIG. 15A once an interrupt or subroutine call has occurred and the system has decided 302 that a new record is to be written or added, the system determines 304 the number of record segments needed by dividing the data size by the data field 54 byte width. In the case of the data structure of FIG. 3, the data size provided to program 18 is divided by twenty-eight. The system then finds 306 a sufficient vacant space to store the new record by examining the vacant space table 24 as discussed previously with respect to the previous embodiment. The record count is then written 308 into the segment header 52 and the data is written 310 into the data field 54 of the record. This step only stores as much of the new record data as will fit into the record segment and maintains the remaining data in a buffer. This step also decrements the remaining data count which is then compared 312 to determine whether any data remains. If so, the address field 56 is updated 314 by incrementing the address of the current record by 1 and storing it in the link field 56. The record count is decremented and the new record header (at the address just stored in field 56) is updated 316. This loop continues until no data remains and the system places 318 an end of record indicator into the next segment address field 56.

Figure 15B:
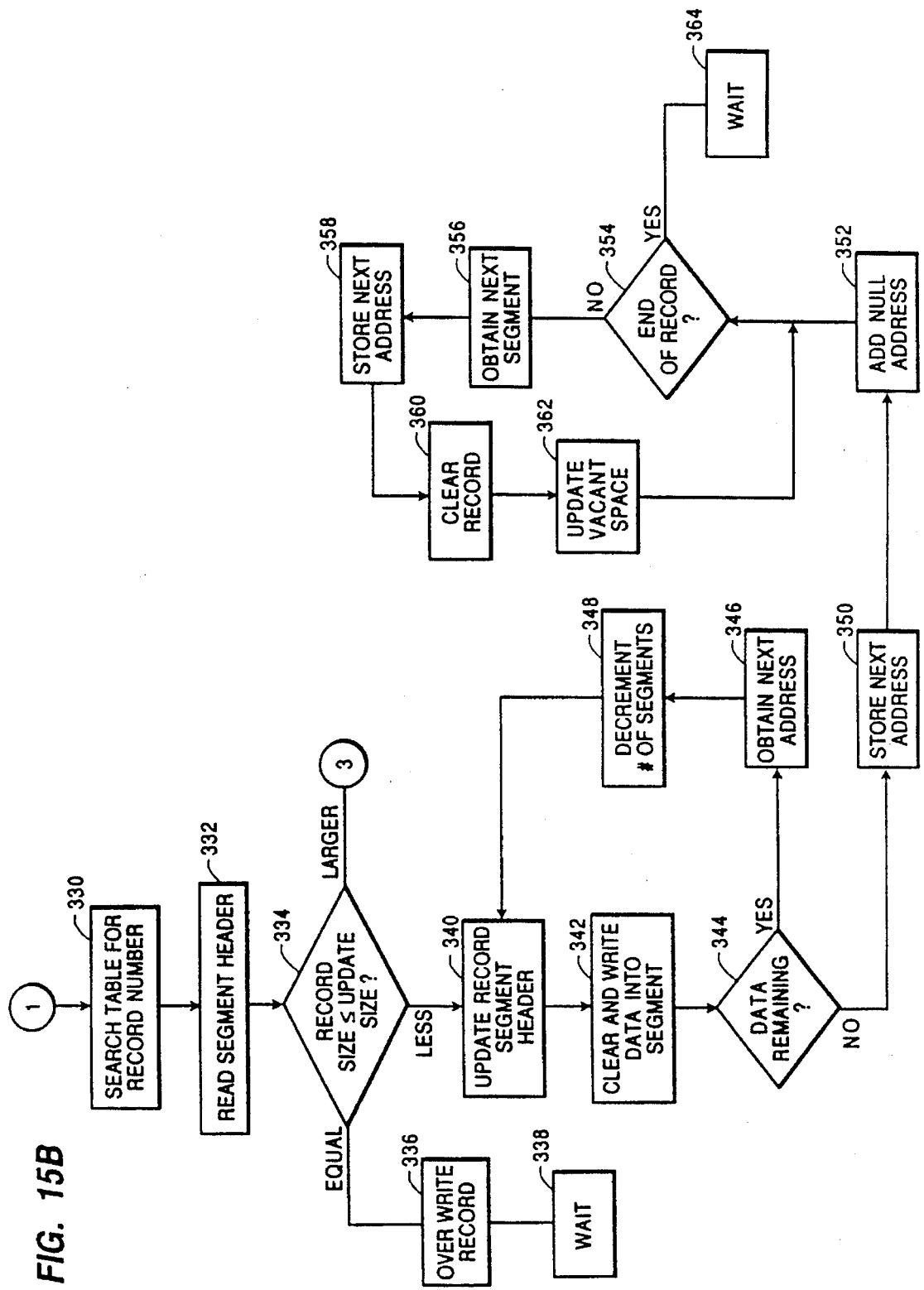

When the system requests a data renewal or update, as illustrated in FIG. 15B, the system searches 330 the cross reference table 22 for the record number and then reads 332 the corresponding record segment particularly the record header. The size of the record (number of segments in field 52) is compared 334 with the size of the updated record and if the record sizes are equal the record is overwritten 336 by partitioning the updating record into equal size segments and following the chain of record addresses found in the field 56 until all the record segments have been overwritten.

If the record size is smaller the record segment header is updated 340 to reflect the reduced number of segments, the data space is cleared and the corresponding portion of the updated record is written 342 into the segment. The system then determines 344 whether any data remains to be written and, if so, obtains 346 the next address from the field 56 of the current record. The number of segments is then decremented 348 and the record header at the next address is updated 340. This loop continues until all the data has been written. Since the updating record is smaller than the original record the system must now make the remaining segment records, if any, vacant and update the vacant space table. This is performed by first storing 350 the next address found in the field 56 of current record segment and storing 352 a null indicator in the field 56. The stored next address is then examined 354 to determine whether the next address is a null indicator indicating that the end of the record has been reached. If the end of the record has not been reached, the next address is used to obtain 356 the next segment and the next address in that segment is stored 358. This new record is then cleared 360 and the vacant space table is updated by 362 by adding an appropriate entry. This loop continues until the stored next address is a null indicator at which time the update process for records smaller than the original record stops.

Figure 15C:
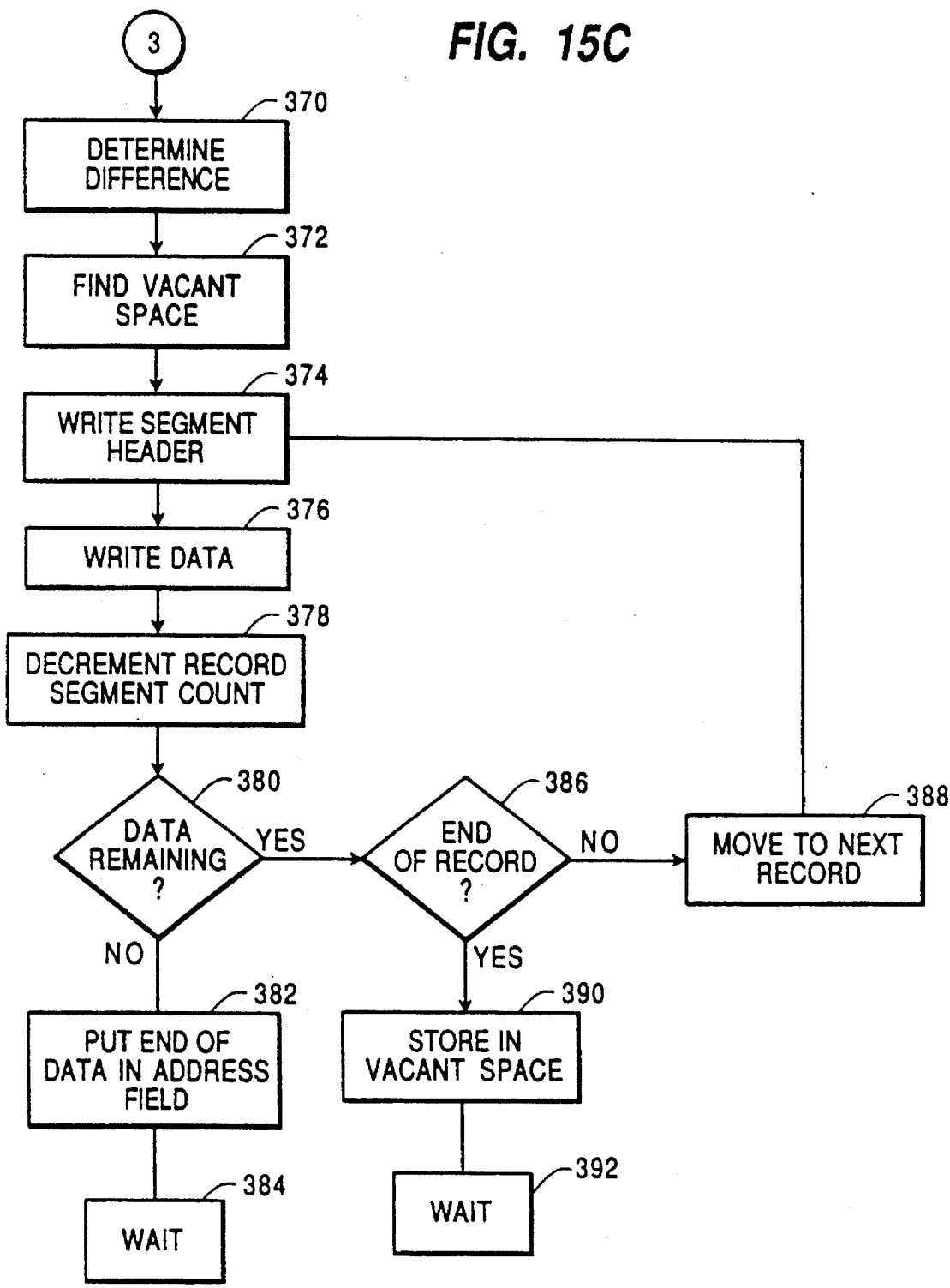

When the updated record is larger than the original record size, as illustrated in FIG. 15C, the system determines 370 the difference in size as a number of record segments. The system then searches 372 for a sufficient size vacant space to store the difference and then writes 374 the total number of record segments for the record into the current record segment, followed by writing 376 the data into the data field 54 of the current record segment. The system then decrements 378 the record segment count and if this record segment is equal to zero indicating 380 that there is no data remaining, the system places 382 an end of data indicator in the address field 56. If the record segment count indicates data remains, the system examines 386 the address field 56 of the current record segment to determine whether this is the end of the record. If not, the address is used to move 388 to the next record segment. This loop is continued until the end of the original record is encountered and the system then stores 390 the remaining portion of the record in a vacant space by performing the operations illustrated in steps 308–318 of FIG. 15A.

If a record should be deleted, as illustrated in FIG. 15D, the system first searches 400 for the record number in the cross reference table 22, obtains the record segment and stores 402 the contents found in the next address field 56. The system then updates 404 the vacant space table 24 with the address of the current record segment and clears 406 that current record segment. The next address stored in step 402 is examined 408 to determine whether the end of the record has been reached and, if not, the next record segment is obtained 410 using the next address. When the end of the record has been reached, the system performs the file compression and record concatenation operations discussed with respect to FIG. 8, thereby storing the data in sequential fixed record segments. The system also performs the read operation for fixed length record segments in substantially the same manner as discussed with respect to FIG. 8.

The many features and advantages of the invention are apparent from the detailed specification and thus it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention. For example, it is possible to implement the system without the cross reference table 22 when looking for records by sequentially reading each record segment in the file, determining the next read address from the size field of the record and if a vacant space is encountered as indicated by a cleared or null size field, accessing the vacant space table to indirectly determine the address of the next segment in the file. It is also possible to do without the vacant space table and make requests for vacant space to a memory management system that determines the location of a space of sufficient size and adds vacant space when a record or portion is deleted. It is also possible to do without the file request indicator which indicates the type of file request (read, update, add, delete) by examining the size field of the request. For example, if the size field is positive the request is either an add or an update, and is an add if the record does not exist in the file. If the record size is zero the request is a delete request and if null is a read request. It is also possible to remove vacant space in the file by reading the record segments, sorting them and writing them to a new file allocated for that purpose and updating the tables accordingly. It is further possible to eliminate the size provided in the data request and allow the program 18 at step 102 to determine the size by counting the used bytes in the buffer supplied thereto. Finally, even though the present invention has been described as being initiated by an application program, the present invention can function as a data base utility program.

What is claimed is:

1. A dynamic data storage and access system, comprising:

storage storing a file of contiguous records including a first record segment of a record, stored at a first location and including data having a stored length and a next address field and storing a cross reference index table including a record number and the first location address;

a processor connected to said storage and said processor:
determining whether an input length of input data is less than, equal to or greater than the stored length,
reducing the stored length to the input length and storing the input data in the first record segment of the record and having the reduced stored length and designating resulting vacant space in the file when the input length is less than the stored length,
storing the input data in the first record segment of the record and in a second record segment of the record at a first available vacant second location in the file and storing an address of the second record segment of the record in the next address field different from the address of the first location address when the input length is greater than the stored length,
combining the first and second record segments of the record into a single record segment of the record when a vacant area in the file equal to a size of the first and second record segments of the record combined becomes available;
storing an address of the vacant area as the first location address in said table when the first and second record segments are combined into the single record segment;
accessing the record using the first location address when the stored length is reduced;
accessing the record comprising the first and second record segments using the first location address and the address in the next address field when the input length is greater than the stored length; and accessing the record comprising the single record segment using the first location address when the first and second record segments are combined.

2. A method of dynamic data storage and access, comprising:

(a) allowing a user to input data of a record having an input length;

(b) comparing the input length to a stored length of a first record segment of the record at a first location;

(c) allocating a second record segment of the record at a second location different from the first location and having a length equal to a storage space difference which is a difference in storage space between the input and stored lengths when the input length is greater than the stored length;

(d) linking the first record segment of the record to the second record segment of the record by storing an address of the second record segment of the record in the first record segment of the record when the input length is greater than the stored length;

(e) storing the input data of the record in the first and second record segments of the record when the input length is greater than the stored length;

(f) reducing a size of the first record segment of the record when the stored length is greater than the input length;

(g) indicating the storage space difference is available for data storage when the stored length is greater than the input length;

(h) allowing the user to indicate a record segment of the record is to be deleted and deleting the record segment;

(i) indicating the deleted record segment is available for data storage when the record segment is deleted;

(j) searching for file vacant space having a space length;

(k) combining the first and second record segments of the record and into a contiguous combined single record segment and storing the combined record segments as the single record segment in the vacant space when the combined first and second record segments have a combined length shorter than or equal to the space length of the vacant space;

(l) storing a record number of the record and the vacant space address in a record cross reference index table when the first and second record segments are combined and storing the record number and the first location in said table when the first and second record segments are not combined;

(m) accessing the record comprising the single record segment using the vacant space address of said table when the first and second record segments are combined; and (n) accessing the record comprising the first and second record segments using the first location of said table and the address of the second record segment stored in the first record segment when the first and second record segments are not combined.

* * * * *

UNITED STATES PATENT AND TRADEMARK OFFICE
CERTIFICATE OF CORRECTION

PATENT NO. : 5,548,751
DATED : August 20, 1996
INVENTOR(S) : Ryu et al.

It is certified that error appears in the above-indentified patent and that said Letters Patent is hereby corrected as shown below:

```
Column 1, line 44, after "want" insert --to--.
Column 2, line 64, "thee" should be --the--.
Column 2, line 65, after "record" insert --segments
        are used-- and change "." to --;--.
Column 6, line 24, "8A-BE" should be --8A-8E--.
```

Signed and Sealed this

Eighteenth Day of March, 1997

Attest:

BRUCE LEHMAN

*Attesting Officer*     *Commissioner of Patents and Trademarks*